United States Patent [19]

Arai et al.

[11] Patent Number: 4,550,053

[45] Date of Patent: Oct. 29, 1985

[54] RECORDING MEDIUM

[75] Inventors: Ryuichi Arai; Shigeo Toganoh, both of Tokyo, Japan

[73] Assignee: Canon Kabushiki Kaisha, Tokyo, Japan

[21] Appl. No.: 592,300

[22] Filed: Mar. 22, 1984

[30] Foreign Application Priority Data

Mar. 24, 1983 [JP] Japan ................................. 58-47997

[51] Int. Cl.⁴ .............................................. B41M 5/00
[52] U.S. Cl. ............................... 428/304.4; 346/135.1; 428/195; 428/318.4; 428/321.3

[58] Field of Search .............................. 346/1.1, 135.1; 400/126; 427/261, 288; 428/195, 207, 211, 524, 530, 537.5, 304.4, 318.4, 321.3

[56] References Cited

U.S. PATENT DOCUMENTS 4,481,244 11/1984 Haruta et al. .................... 346/135.1

*Primary Examiner*—Bruce H. Hess
*Attorney, Agent, or Firm*—Fitzpatrick, Cella, Harper & Scinto

[57] ABSTRACT

A recording medium for ink-jet recording comprises a D-sorbitol-benzaldehyde condensation product.

7 Claims, No Drawings

RECORDING MEDIUM

BACKGROUND OF THE INVENTION

1. Field of the Invention

The present invention relates to a recording medium for ink-jet recording and more particularly to a recording medium of excellent ink absorptiveness and clearness of the image recorded thereupon.

2. Description of the Prior Art

The ink-jet recording process involves ejecting small droplets of recording liquid (ink) by various ink-discharging techniques (e.g., the technique utilizing electrostatic attraction, technique of vibrating or displacing ink mechanically by use of piezo elements, technique utilizing the foaming pressure of ink generated by heating) and depositing parts or all of the ejected droplets onto a recording medium such as paper, thereby performing the recording.

Ink-jet recording is noticed as a recording method which generates limited noises and permits a high-speed recording and multicolor printing. For the ink-jet recording, recording liquids containing water as the main component are predominantly used for reasons of safety and recording characteristics, and in many cases a polyhydric alcohol is added thereto so as to prevent the clogging of the nozzles and improve the discharge stability.

Recording media hitherto used for the ink-jet recording are usual plain paper and so-called ink-jet recording paper that comprises a substrate and a porous, ink absorbing layer laid thereupon. However, more sophisticated and comprehensive performance characteristics are increasingly required of the recording media, with improvements in the performance of ink-jet recording apparatuses, such as the speed-up of recording and the development of multicolor recording, and with expanding use of ink-jet recording apparatuses. That is to say, the recording medium for ink-jet recording needs to fulfill the following various fundamental requirements on performance characteristics in order to form high resolution, high quality images.

(1) The recording medium should absorb ink as quickly as possible.

(2) An ink dot, when overlapping a previously applied ink dot, should not disorder it.

(3) Ink droplets should not diffuse on the recording medium, or the diameters of ink dots should not be more enlarged than is necessary.

(4) The shapes of ink dots should be close to a right circle and the perimeters of ink dots should be smooth lines.

(5) Ink dots should have high OD (optical density) and distinct perimeter lines.

In addition to these characteristics, the following characteristics are required of the recording medium in order that images of high resolution comparable to that of color photographs may be obtained by the multicolor ink-jet recording process.

(6) Colorants in the inks applied onto the recording medium should show excellent color developing properties.

(7) The recording medium should be excellent particularly in its ability to fix inks since in some cases ink dots of the same number as that of the colors of inks employed are deposited onto the same spot to overlap one another.

(8) The recording medium should have a glossy surface.

(9) The recording medium should show a high brightness.

In the past, recording media for ink-jet recording were exclusively used for the purpose of obtaining non-light-transmitting type image: (surface image observation purpose). However, with improvements in the performance of ink-jet recording apparatuses and with expanding use thereof, demands are growing for recording media suited for purposes other than the surface image observation purpose. Such new applications of recording media include, for example, the projection of a recorded image onto a screen or the like by use of an optical device such as a slide or OHP (overhead projector), color separation plates for making positive plates used in color printing, and CMF's (color mosaic filters) for use in liquid crystal color display devices and the like.

Diffuse light scattered by recorded images is observed when the recording media are used for the surface image observation purpose. On the contrary, the light transmitted by the formed image is of main concern when the recording media are used for the above new purposes.

Accordingly, excellent transparency and particularly excellent linear transmittance are required besides the above noted requirements for ink-jet recording media. However, a recording medium of light-transmitting type has not yet been found that fulfills all the above noted requirements.

Most of the conventional recording media of non-light-transmitting type have a porous, ink absorbing layer at the surface to absorb the ink into the voids of the layer. Therefore, the surface of such recording media is non-glossy because of the porous state. On the other hand, when the ink-absorbing surface layer is non-porous, nonvolatile components such as a polyhydric alcohol contained in the applied ink will remain for a long time on the surface; that is, a long time is required for drying or fixing the ink; in consequence, such recording media are disadvantageous in that the formed image, on contacting with an object, e.g., clothing, will stain it or be impaired.

SUMMARY OF THE INVENTION

An object of the invention is to provide a recording medium for ink-jet recording which is excellent particularly in ink reception and in clearness of the image recorded thereupon.

Another object of the invention is to provide a recording medium for ink-jet recording which has a porous ink-receiving layer at the surface and is particularly excellent in ink reception.

A further object of the invention is to provide a recording medium for ink-jet recording of full color which is excellent in the ink reception clearness of the image recorded and surface glossiness.

Still another object of the invention is to provide a recording medium for ink-jet recording, which is suitable for transmitted light observation purposes such as the projection of a recorded image onto a screen or the like by an optical device such as a slide or OHP, color separation plates for making positive plates used in color printing, and CMF's used in liquid-crystal color display devices and the like.

These and other objects of the invention will be more apparent from the following description.

According to the invention, there is provided a recording medium comprising a D-sorbitol-benzaldehyde condensation product.

DETAILED DESCRIPTION OF THE PREFERRED EMBODIMENTS

The D-sorbitol-benzaldehyde condensation product contained in the recording medium of the invention can be synthesized by condensation of D-sorbitol with benzaldehyde and may have a former-to-latter molar ratio of 1:1, 1:2, or 1:3, more suitably 1:2 or 1:3, and most suitably 1:2.

Derivatives of the above condensation product can also be used similarly in the invention. Said derivatives can be synthesized by introducing various substituents into the above condensation product according to known methods or by condensations of D-sorbitol with benzaldehyde derivatives which are used in place of benzaldehyde. These condensation products, including said derivatives, can be used alone or in combination.

The D-sorbitol-benzaldehyde condensation product in which the former-to-latter molar ratio is 1:2 is called dibenzylidene sorbitol (supplied by Shin Nippon Rika K.K. under the tradename Geruoru D) and the product in which the molar ratio is 1:3 is called tribenzylidene sorbitol (supplied by the above company under the tradename Geruoru T).

Dibenzylidene sorbitol is a chemically neutral compound and fairly soluble (around 20% by weight) in such solvents as N-methylpyrrolidone, N,N-dimethylformamide, dimethylsulfoxide, and the like, but slightly soluble in the majority of solvents, e.g., ethanol, isopropanol, ethylene glycol, glycerol, diethylene glycol, benzyl alcohol, ethyl cellosolve, tetrahydrofuran, dioxane, cyclohexylamine, aniline, and pyridine; after dissolution by heating of this compound in these solvents, cooling causes the gelation of the solutions. In the invention, this gelation ability (the ability to cause the gelation or solidification of liquids) of the above condensation product depresses the mobility of a low-volatile solvent such as a polyhydric alcohol contained in the recording liquid applied on the recording medium for ink-jet recording, thereby accomplishing the fixation of the recording liquid.

The recording medium of the invention generally comprises a substrate as a support and an ink-receiving layer formed on the surface of the substrate, or it may have such a structure in which the support and the ink-receiving layer are integrally formed as one body. The following (1)–(4) can be exemplified as preferred embodiments of the recording medium according to the invention.

(1) A type of recording medium comprising a transparent substrate and a transparent ink-receiving layer formed on the substrate, the above condensation product being contained in the ink-receiving layer.

This type of recording medium is excellent particularly in transparent and used chiefly as the recording medium for transmitted light observation purposes such as the purpose of recording an image thereupon and projecting the formed image onto a screen or the like by passing a light beam through the recording medium using an optical device such as an OHP.

Transparent substrates usable for this type of recording medium may include films or plates of plastics, e.g., polyester, cellulose diacetate, cellulose triacetate, acrylic polymer, polycarbonate, poly(vinyl chloride), polyimide, cellophane, and celluloid, and glass plates. From these, an appropriate substrate is chosen according to the purpose of recording or the use of record.

The ink-receiving layer may be composed basically of the above condensation product and a macromolecular material or resin which can form a transparent continuous coating.

Such macromolecular materials or resins may include, e.g. starch, casein, albumin, gum arabic, sodium alginate, poly(vinyl alcohol), polyurethane, poly(vinyl formal), phenolic resin, ionomer resin, poly(vinyl butyral), polyamide, polyacrylamide, polyvinylpyrrolidone, ethylene-vinyl acetate copolymer, and poly(vinyl acetate). These polymers can be used alone or in combination. The condensation product may be used in amounts of about 5 to 200 parts, preferably about 10 to 100 parts, by weight per 100 parts by weight of the resin.

The ink-receiving layer can be formed in the following way: A mixture of the condensation product and the macromolecular material or resin, dissolved if necessary in a solvent with or without heating, is applied on the transparent substrate by the method of roll coating, rod bar coating, spray coating, air-knife coating, or hot melt coating, and is dried or cooled. Alternatively, the resin is applied as a primer on the substrate, and then the condensation product dissolved in a solvent is applied thereupon and dried. Under certain circumstances, for the purpose of improving the ink absorptiveness, the ink-receiving layer can be made porous by dispersing therein a filler, e.g., finely divided silica, clay, talc, diatomaceous earth, calcium carbonate, calcium sulfate, barium sulfate, aluminum silicate, synthetic zeolite, alumina, zinc oxide, lithopane, or satin white, in such amounts as not to detract from the transparency, i.e., the linear transmittance of the recording medium. It may be noted that the, transparent substrate or the transparent ink-receiving layer need not always be colorless; no trouble will be caused when the recording medium is colored, provided that it is transparent.

The term "linear transmittance" (T %) used herein is the value determined as follows: With a photometer is measured the spectral transmittance of a straightforward light beam which has perpendicularly entered the specimen and passed through it and then through a slit positioned apart at least 8 cm from the specimen and on the extension of the incident light path. The Y value of tristimulus values is determined from the found spectral transmittance. Then, the T % is calculated according to the equation.

$$T = (Y/Y_o) \times 100 \qquad (1)$$

where, Y is the found Y value of the specimen and Yo is the Y value for blank. For example, a Hitachi recording spectrophotometer-model 323 (supplied by Hitachi, Ltd.) can be employed for the above photometer.

Accordingly, the linear transmittance herein, being for the straightforward light, differs from the diffuse transmittance (a transmittance measured with an integrating sphere placed behind the specimen, on the light transmitted by the specimen including the diffuse light) and from the opacity (the ratio of the diffuse light intensity measured with a white backing being applied on the rear side of the specimen to that measured with a black backing being applied). Since a main concern in using instruments in which optical techniques are utilized is the behavior of straight-forward rays, the determination of the linear transmittance of the recording media to be used in such instruments is particularly important for evaluating the transparency of the media.

For instance, when an image formed on a recording medium is projected on a screen by use of an OHP, it is required in order to obtain a distinct, easy-seeable projected image with a high contrast between the image area and the image-less area on the screen that the image-less area on the screen be bright, in other words, the linear transmittance of the recording medium be higher than a definite level. According to tests by use of an OHP and test charts, it has been found that the recording medium needs to have a linear transmittance of at least 2% in order to obtain a projected image of such good quality as mentioned above and at least 10% in order to obtain a clearer projected image. Thus, this type of recording medium needs to have a linear transmittance of at least 2%.

(2) A type of recording medium comprising a substrate and an ink-receiving layer laid thereupon and having a smooth surface, the above condensation product being contained in the ink-receiving layer.

This type of recording medium is excellent in surface gloss, much superior in ink reception to the conventional recording media having similarly smooth surface, and is used as the recording medium for recording full-color images excellent in clearness for the surface image observation purpose.

While paper is suited for the substrate in this case, the substrate used is not particularly limited thereto but may be selected from cloths, wood plates, metal plates, resin films, and synthetic paper sheets.

The ink-reception layer, though it is composed basically of the above-mentioned condensation product and a resin capable of forming a continuous coating, differs from the above case (1) in being not required to be transparent. However, the ink-receiving layer in this case can be formed in nearly the same manner as in the case (1). The condensation product is used in amounts of 5 to 200 parts, preferably 10 to 100 parts, by weight per 100 parts by weight of the macromolecular material.

(3) A type of recording medium comprising a single film composed mainly of a thermoplastic or solvent-soluble resin and the above condensation product.

This type of recording medium when it is transparent is similar to the type (1) and when not transparent is similar to the type (2), in properties and applicability.

Since this type of recording medium comprises a film of known thermoplastic resin or solvent-soluble resin to which film the condensation product is added, it can be produced by applying known various film-forming processes such as calendering, inflation, T-die film extrusion, solution casting, etc. Suitable macromolecular materials for this embodiment may include, for example, cellophane, cellulose acetate, polyethylene, poly(vinyl chloride), polystyrene, poly(vinyl alcohol), polyester, polyamide, polyimide, polycarbonate, acrylic polymer, and rubber hydrochloride. The condensation product is used in amounts of 5 to 100 parts, preferably 10 to 70 parts, by weight per 100 parts by weight of the macromolecular material.

(4) A type of recording medium comprising a substrate and a porous ink-receiving layer laid thereupon, the above condensation product being contained in the ink-receiving layer.

This type of recording medium is particularly excellent in ink reception and used for recording full-color images excellent in clearness for the surface image observation purpose.

For the substrate in this case, various materials can be used as in the above case (2) without any particular restriction.

The ink-receiving layer comprises filler particles, a binder, and the condensation product. Materials usable as the filler may include white inorganic pigments, e.g., silica, clay, talc, diatomaceous earth, calcium carbonate, calcium sulfate, barium sulfate, titanium oxide, zinc oxide, satin white, lithopone, alumina, and zeolite and particles of organic macromolecular compounds, e.g., polystyrene, polyethylene, urea-formaldehyde resin, poly(vinyl chloride), and poly(methyl methacrylate). These can be used alone or in combination. Materials usable as the binder may include; water-soluble polymers, e.g. starch, gelatin, casein, gum arabic, sodium alginate, carboxymethyl cellulose; latexes of synthetic rubber and synthetic resin, and organic solvent-soluble resins, e.g., poly(vinyl butyral), poly(vinyl chloride), poly(vinyl acetate), polyacrylonitrile, poly(methyl methacrylate), poly(vinyl formal), melamine resin, polyamide, phenolic resin, polyurethane, and alkyd resin. These also can be used alone or in combination. The condensation product is used in amounts of 1 to 50 parts, preferably 2 to 30 parts, by weight for 100 parts by weight of all materials constituting the ink-absorptive layer.

The ink-receiving layer is formed by dispersing all the necessary components for constituting the ink-receiving layer in a vehicle such as water, applying the resulting dispersion on a substrate in any of various suitable ways, and drying the coating as quickly as possible. The coating is controlled to have a thickness of about 1 to about 200 μm, preferably about 5 to about 80 μm.

While typical embodiments of the recording medium according to the invention have been described, it is a matter of course that the recording medium is not limited to these embodiments. In any of the embodiments, various additives such as a dispersant, fluorescent dye, pH regulator, defoaming agent, lubricant, preservative, surfactant, etc. can be incorporated into the ink-receiving layer.

By use of the recording medium, according to the invention, which comprises a D-sorbitol-benzaldehyde condensation product, a high resolution, clear, and good-colored image can be obtained without causing the mixing, blotting or bleeding of ink even when ink droplets of different colors are applied to the same point on the recording medium at short time intervals. In addition, the recording medium can be made so as to have a high surface gloss never found in the prior art recording media for ink-jet recording, and can also be used for purposes other than the conventional surface image observation purpose; that is, the recording medium of the invention can also be used for the projection of an image recorded thereupon onto a screen or the like by use of an optical device such as a slide or OHP, for a color separation plate to make a positive plate used in color printing, or for a CMF used in a liquid-crystal color display device.

The invention is illustrated in more detail referring to the following examples.

EXAMPLE 1

The following coating composition A was applied on a transparent substrate 80 μm thick poly(ethylene terephthalate) film (made by Imperial Chem. Industries, Ltd.) by means of a bar coater and dried at 80° C. for 20 minutes to give a coating of about 30 μm thickness. Further, the following coating composition B was applied thereupon by means of a bar coater and dried at 100° C. for 20 minutes to form an ink-receiving layer of about 2 μm thickness.

| Coating composition A: | |
|---|---|
| Poly(vinyl alcohol) (PVA HC, made by Kurare Co., Ltd.) | 20 parts by wt. |
| Water | 80 parts by wt. |
| Coating composition B: | |
| Dibenzylidene sorbitol | 20 parts by wt. |
| N,N—Dimethylformamide | 80 parts by wt. |

The thus obtained recording medium was colorless and transparent. Ink-jet recording tests were conducted thereupon by discharging the following four kinds of inks from an on-demand type of ink-jet recording head with piezo oscillators (discharge orifice diameter 50 μm, piezo oscillator driving voltage 60 V, frequency 4 KHz).

| Yellow ink (composition): | |
|---|---|
| C.I. Acid Yellow 23 | 2 parts by wt. |
| Diethylene glycol | 20 parts by wt. |
| Water | 85 parts by wt. |
| Red ink (composition): | |
| C.I. Acid Red 92 | 2 parts by wt. |
| Diethylene glycol | 20 parts by wt. |
| Water | 85 parts by wt. |
| Blue ink (composition): | |
| C.I. Direct Blue 86 | 2 parts by wt. |
| Diethylene glycol | 20 parts by wt. |
| Water | 85 parts by wt. |
| Black ink (composition): | |
| C.I. Direct Black 19 | 2 parts by wt. |
| Diethylene glycol | 20 parts by wt. |
| Water | 85 parts by wt. |

In the recording tests, performance characteristics of the recording medium were evaluated according to the following methods. Results thereof are shown in Table 1.

(1) Ink fixation time: The time for drying the applied ink droplets to such a degree that the ink does not adhere to a finger when the recording medium after recording has been completed is left standing at room temperature and the recorded image is touched with the finger.

(2) Optical density of ink dot: Measured on black ink dots by using Microdensitomer PDM-5 (supplied by Konishiroku Photo Industry Co., Ltd.) in accordance with JIS K-7605.

(3) Applicability to OHP: Measured for evaluating the applicability of transparent recording media to optical instruments by projecting an image formed on the test recording medium onto a screen using an OHP as a representative example of the optical instruments, and observing visually the image formed on the screen. The results were rated as follows:

O: The image-less area of the recording medium is bright; OD (optical density) of the recorded image is high; the projected image is clear and easy to see and exhibits a high contrast.

Δ: The image-less area of the recording medium is slightly dark; OD of the recorded image is somewhat low; and lines of 0.1 mm in each width and 0.25 mm in intervals are not clearly discernible.

X: The image-less area of the recording medium is considerably dark; OD of the recorded image considerably low; and lines of 0.3 mm in each width and 1 mm in intervals are not clearly discernible or the image-less area and the recorded image are indistinguishable.

(4) Linear transmittance: It was determined by measuring the spectral transmittance using a Hitachi recording spectrophotometer model 323 (supplied by Hitachi, Ltd.) with maintaining the distance between the specimen and the window of the photodetector at about 9 cm, and applying the obtained values to the foregoing equation (1).

(5) Gloss: It is a 45° specular gloss of the test recording medium measured in accordance with JIS Z-8741.

EXAMPLE 2

The following coating composition C was applied on the same transparent substrate as used in Example 1 by means of a bar coater and dried at 100° C. for 20 minutes to form an ink-receiving layer of about 10 μm thickness.

| Coating composition C: | |
|---|---|
| Poly(vinyl alcohol) (PVA KL-506, made by Kurare Co., Ltd.) | 4 parts by wt. |
| Polyvinylpyrrolidone | 16 parts by wt. |
| Dibenzylidene sorbitol | 4 parts by wt. |
| N,N—Dimethylformamide | 76 parts by wt. |

The colorless, transparent recording medium thus obtained was subjected to ink-jet recording tests and performance characteristics thereof were evaluated, in the same manner as in Example 1: Results thereof are shown in Table 1.

EXAMPLE 3

The following coating composition D was applied on the same transparent substrate as used in Example 1, by means of a bar coater, and dried at 80° C. for 10 minutes to form an ink-receiving layer of about 20 μm thickness.

| Coating composition D: | |
|---|---|
| Acrylic polymer (Dianal BR, made by Mitsubishi Rayon Co., Ltd.) | 3 parts by wt. |
| Tribenzylidene sorbitol | 3 parts by wt. |
| Fine powder of silica | 12 parts by wt. |
| Xylene | 40 parts by wt. |
| Methyl isobutyl ketone | 40 parts by wt. |

The thus obtained recording medium was white and opaque. It was subjected to ink-jet recording tests and performance characteristics thereof were evaluated, in the same manner as in Example. Results thereof are shown in Table 1.

EXAMPLE 4

A recording medium was prepared in the same manner as in Example 2 but using art paper as the substrate. The white, opaque recording medium obtained was subjected to ink-jet recording tests and performance characteristics thereof were evaluated, in the same manner as in Example 1. Results thereof are shown in Table 1.

EXAMPLE 5

The following coating composition E was applied on a polyester film by means of a bar coater and dried at 80° C. for 1 hour to form a coating of about 100 μm thinkness. Then a colorless, transparent recording medium was obtained by peeling the coating from the polyester base film.

| Coating composition E: | |
| --- | --- |
| Cellulose diacetate (made by Daicel Co., Ltd.) | 20 parts by wt. |
| Dibenzylidene sorbitol | 5 parts by wt. |
| N,N—Dimethylformamide | 40 parts by wt. |
| Methylene chloride | 40 parts by wt. |

This recording medium was subjected to ink-jet recording tests and performance characteristics thereof were evaluated, in the same manner as in Example 1. Results thereof are shown in Table 1.

COMPARATIVE EXAMPLE 1

The same polyester film as used in Example 1 was used as a recording medium to carry out the ink-jet recording tests, and performance characteristics thereof were evaluated, in the same manner as in Example 1. Results thereof are shown in Table 1.

COMPARATIVE EXAMPLE 2

A recording medium was prepared in the same manner as in Example 1 but without applying the coating composition B. The colorless, transparent recording medium obtained was subjected to ink-jet recording tests, and performance characteristics were evaluated, in the same manner as in Example 1. Results thereof are shown in Table 1.

COMPARATIVE EXAMPLE 3

The same art paper as used in Example 4 was used as a recording medium to carry out ink-jet recording tests, and performance characteristics were evaluated, in the same manner as in Example 1. Results thereof are shown in Table 1.

TABLE 1

| Example No. | Ink fixation time | Optical density of ink dots | Applicability to OHP | Linear transmittance (%) | Gloss (%) | General rating |
| --- | --- | --- | --- | --- | --- | --- |
| Example 1 | 15 min. | 1.0 | O | 52 | — | O |
| Example 2 | 10 min. | 1.2 | O | 72 | — | O |
| Example 3 | 5 min. | 0.7 | — | — | 21 | O |
| Example 4 | 10 min. | 0.8 | — | — | 66 | O |
| Example 5 | 15 min. | 1.2 | O | 81 | — | O |
| Comparative Example 1 | 7 days | 1.2 | O | 74 | — | X |
| Comparative Example 2 | 3 days | 1.2 | O | 72 | — | X |
| Comparative Example 3 | 5 days | 0.5 | X | — | 38 | X |

What is claimed is:

1. A medium for recording with ink comprising a substrate and an ink-receiving layer provided on said substrate, said ink-receiving layer including a D-sorbitol-benzaldehyde condensation product and a resin.

2. A medium according to claim 1, wherein said substrate is transparent and said ink-receiving layer is transparent and ink-absorptive.

3. A medium according to claim 1, wherein said ink-receiving layer is ink-absorptive and has a smooth surface.

4. A medium according to claim 1, wherein said ink-receiving layer is porous.

5. A medium according to claim 4, wherein the amount of said condensation product is 5 to 200 parts by weight per 100 parts by weight of said resin in said ink-receiving layer.

6. A medium for recording with ink comprising an ink-receiving layer including a D-sorbitol-benzaldehyde condensation product and a thermoplastic resin or a solvent-soluble resin.

7. A medium according to claim 6, wherein the amount of said condensation product is 5 to 100 parts by weight per 100 parts by weight of said resin in said ink-receiving layer.

* * * * *